Jan. 11, 1938. W. S. SAUNDERS 2,104,766
STORAGE BATTERY INSTALLATION
Filed Aug. 21, 1936 2 Sheets-Sheet 2
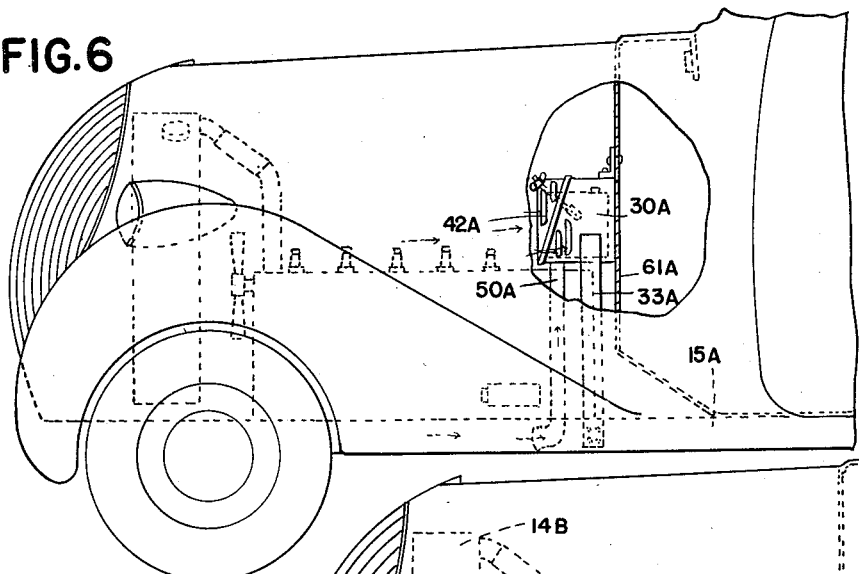
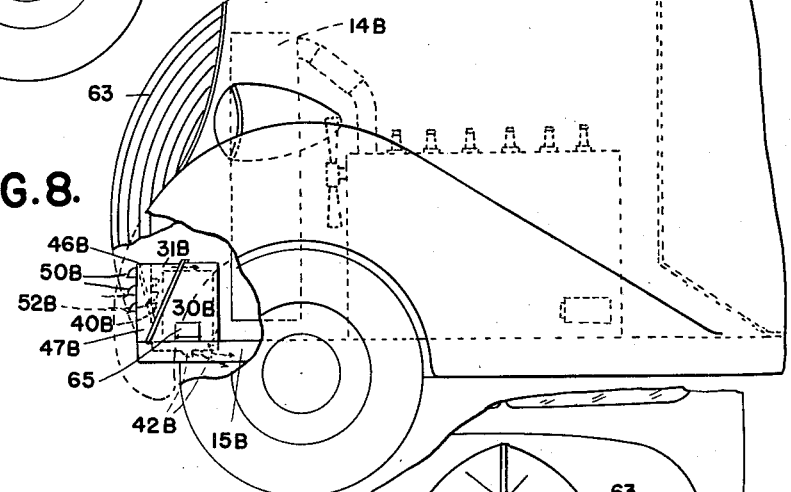
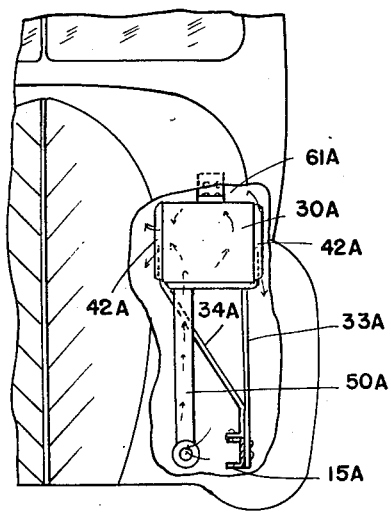
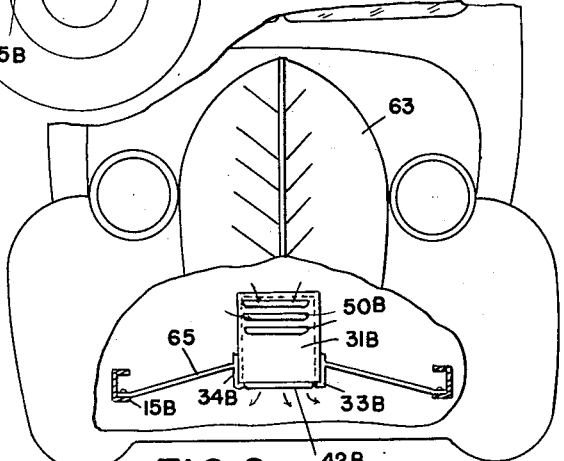
INVENTOR
WALTER S. SAUNDERS
BY
ATTORNEYS Patented Jan. 11, 1938

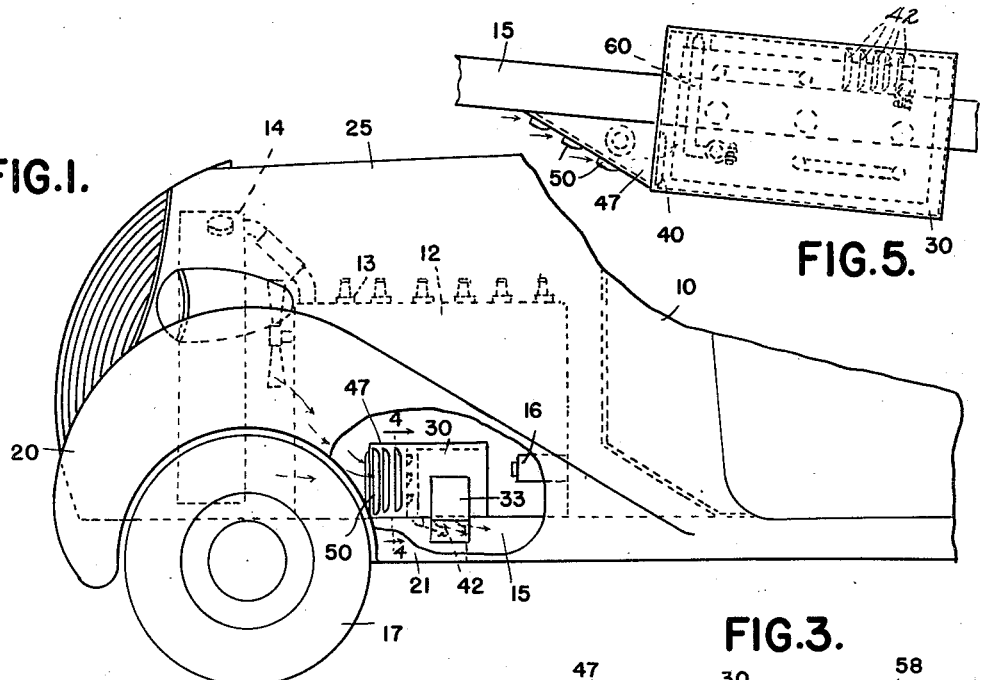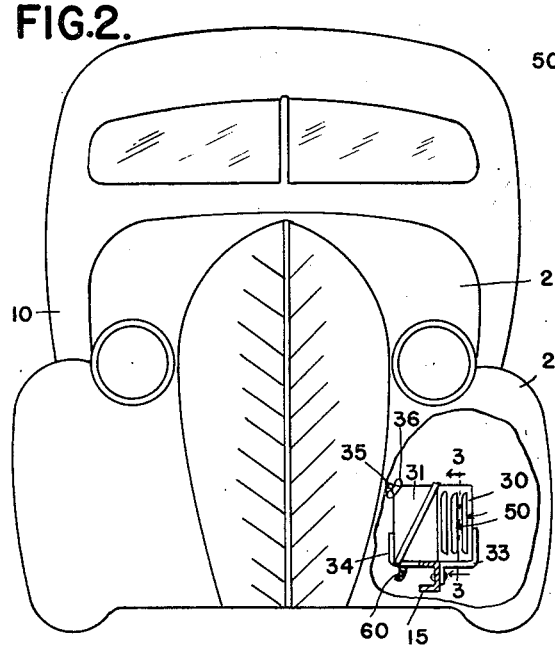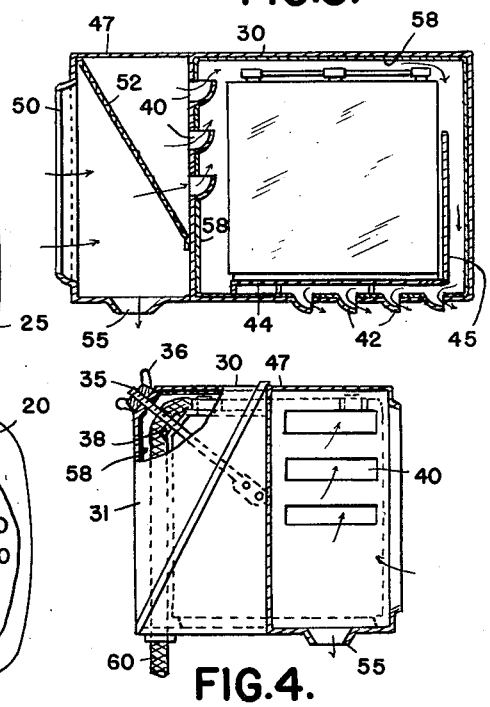

2,104,766

UNITED STATES PATENT OFFICE 2,104,766

STORAGE BATTERY INSTALLATION

Walter S. Saunders, Pontiac, Mich., assignor to The American Forging and Socket Company, Pontiac, Mich., a corporation of Michigan Application August 21, 1936, Serial No. 97,209

14 Claims. (Cl. 180—68.5)

This invention relates to the mounting and installation of storage batteries, and is particularly concerned with the batteries of automobile and other vehicular electrical systems. An important object resides in the provision of improved means for supporting and ventilating such storage batteries.

Modern automobile construction has so reduced the floor and frame levels as to render impracticable the suspension of the storage battery beneath the floor-boards or frame in the manner long customary. Inasmuch as it is also the practice to hold to a minimum the size of the engine compartment, particularly insofar as its fore and aft dimensions are concerned, in order that the usable load space of the vehicle may be as great as possible, the manner in which the storage battery is to be carried has become something of a problem. Within the last few years also, both the demand upon the storage battery of an automobile and the rate at which it is charged by the generator have risen sharply, the result of course being a tendency to overheat the battery. Since it is desired to keep the battery as cool as possible, mounting it in direct heat conductive communication with the engine is objectionable, although on the other hand considerations of economy make desirable arrangement of the battery as close to the engine as is practicable, in order that the relatively heavy and consequently expensive conductors which must be run between the battery and starter motor and other electrical elements appurtenant the motor may be kept as short as possible.

With these considerations in view, the present invention aims to arrange the battery in an accessible position, partly or entirely within the engine compartment, without interfering with the accessibility of the engine or reducing the usable space in the passenger compartment, and to provide means whereby the battery, although located close to the engine, may be cooled and ventilated by a blast of air directed thereover from outside the engine compartment.

A further object is the provision of an improved ventilated battery installation of the character indicated which incorporates novel means for collecting and utilizing air to cool the battery which has not been previously heated, either by the engine or the radiator of the car.

Other objects include the provision of such a battery installation which is concealed beneath the hood and other portions of the car, which provides permanently rigid support for the battery without requiring special bracing means or imposing undue stress upon the lighter portions of the framework, which protects the battery against the unwanted entrance of dirt and water with the air blast, but which despite its many advantages is of simple and inexpensive nature.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a fragmentary side elevational view, partly broken away, of the front portion of an automobile provided with a battery installation incorporating the principles of the present invention.

Figure 2 is a front elevational view of the same, also partly broken away.

Figure 3 is a longitudinal sectional view of the battery box on a larger scale and removed from its support, showing the battery in side elevation, taken substantially on the line 3—3 of Figure 2 and looking in the direction of the arrows.

Figure 4 is an end view of the same, partly broken away to show the cover fastening means.

Figure 5 is a top plan view of a battery box installed upon and showing a portion of the frame of the vehicle.

Figure 6 is a view similar to Figure 1 and showing a somewhat modified installation.

Figure 7 is a fragmentary front view thereof similar to Figure 2.

Figure 8 is a view similar to Figure 1 of another somewhat modified installation.

Figure 9 is a front view thereof similar to Figure 2.

Referring now to the drawings, reference character 10 designates the body portion of an automobile of more or less conventional construction and which is, for illustrative purposes, indicated as provided with an engine 12 and radiator 14 carried at the front of the vehicle, although the place of installation of these elements will be seen to be a matter of choice. The framework of the vehicle is also illustrated as including more or less conventionally arranged side rails 15 sprung upon wheels 17. The vehicle is indicated as equipped with front mudguards as 20 provided with an apron portion 21 so disposed as to conceal the portions of the under body and framework therebeneath. The apron and sloping portions of the front fender will be seen to lie beside the engine compartment, which is indicated as provided with a hood 25. The hood, in order that it may be raised to expose the engine, is provided with any suitable releasable fastening means (not shown), and the hood 25 and fender 20 are indicated as joining, in the manner now common, along a line substantially above the center of the wheel, over the axis of which the frame may be kicked up. Appurtenant the engine are one or more electrically operable elements including spark plugs 13 and the electric starter 16.

Mounted on the side rail 15 and projecting partly into the engine compartment and partly into the space under and within the apron of the fender is a battery box comprising a body portion 30 and a lid portion 31, supported in brackets 33—34, which define a tray-like holder and are welded or otherwise rigidly secured to the frame. The lid portion 31 constitutes the inner wall of the casing which faces the engine, as well as a portion of the top of the box, and is held by bolts 35 projecting angularly from the case through perforations in its top edge and carrying holding wing nuts 36 to clamp the lid in place. The battery is held by a clamping element as 38 also arranged upon the bolts 35. In these respects the battery box construction will be seen to be similar to that disclosed in my copending application Serial No. 64,909, filed February 20, 1936. The box is provided with inwardly opening louvers as 40 in that portion of its front wall which projects from the engine compartment into the open space beneath the fender, and with air outlet apertures as 42 in the bottom of the box inside the engine compartment, so that the air blast from the fan passing over such louvers helps withdraw air from the box. The battery is spaced above the bottom of the box upon a raised support as 44 which also defines a baffle element, being closed at its front and sides and so enclosing the outlet openings 42 that the air to reach them must travel over the entire top of the battery, and out through a duct space provided between the back wall of the box and an upward continuation 45 of the portion 44.

Shielding the louvers 40 is a filter portion housed in a forward extension 47 of the box 30, located, as best shown in Figure 5, entirely outside the engine compartment, and incorporating air inlet louvers or openings 50, arranged angularly with respect to louvers 40. Within the casing extension portion 47 and covering the louvers 40 is a screen 52, and a drain opening 55 is provided in the bottom of such section, the arrangement being such that the screening element 52 is disposed at an angle directly over the outlet opening 55, so that mud and dirt rejected by the screening and louvers tend to fall through the outlet and from the vehicle, while any water entering the compartment in the form of drops is rejected by the angular disposition of the louvers and the screening and may also run from the outlet 55. Any small quantity of rain water which enters the battery compartment will of course do no harm in any event.

The inside of the battery compartment is indicated as lined with asphaltum, pitch or other protective paint or lining as 58, although this is a matter of choice. The connections to the battery terminals may extend from that portion of the bottom of the casing which projects into the engine compartment, such a connecting cable (60) being best shown in Figure 4.

In the modified construction shown in Figures 6 and 7, in which analogous parts have been given like reference characters to those used in describing the first embodiment, distinguished by the addition of the letter "A", the battery box 30A is supported against the dash 61A, being preferably held or braced from the frame side rail 15A as by supporting elements 33A—34A of strap metal or the like. The battery box construction will be seen to be similar to that shown in the embodiment first described, save that only outlet louvers, as 42A, are formed in the box (and cover section also if desired, as shown). The inlet air is directed into the bottom of the box through the pipe 50A extending downwardly therefrom to a point beneath the engine where a forwardly projecting elbow provides an air inlet adapted to catch on-coming air when the vehicle is moving forwardly. The air currents in the engine compartment and over the louvers assist the air flow through the box by tending to draw the air out of the same through the louvers 42A.

In the construction shown in Figures 8 and 9 and further modified in certain particulars, the body portion 30B of the battery box is mounted in front of the radiator 14B and behind the ornamental grille 63, upon a cross-bracing member 65 which extends between the side rails 15B of the frame. The cross bracing member is provided with angularly dropped tray-like box-holding portions 33B—34B adapted to receive the battery box. The cover portion 31B carries a filter section in the form of a forward extension 46B, arranged to act similarly to the section 46 of the embodiment first described, and in which inlet louvers 50B are formed. The filter extension section houses as well a protecting screen 52B covering the inlet louvers 40B formed in the front wall of the battery box cover 31B. The rearwardly opening outlet louvers 42B are arranged in the bottom of the body portion 30B and open behind the battery box support, preferably also in the air stream in order that by ejecting action the outflow from the box may be assisted. The box may of course be reached either by removing the grille 63, or a portion of the grille may be hingedly supported or otherwise movable for the purpose.

While it will be apparent that the illustrated embodiments of my invention herein disclosed are calculated to adequately fulfill the objects and advantages primarily stated, it is to be understood that the invention is susceptible to variation, modification and change within the spirit and scope of the subjoined claims.

What I claim is:

1. In combination with an automotive vehicle incorporating electrically operable elements and having an engine compartment and an outside panel defining at least one wall of said compartment, said engine compartment having an engine therein which develops heat during operation, one or more of said electrically operable elements being appurtenant said engine, a storage battery for supplying current to said electrically operable elements, supporting means for said battery box projecting from the outside of said panel and having air inlet portions upon the outside thereof for inducing a ventilating draft through the box, said box having a cover removable from inside the compartment.

2. In combination with an automotive vehicle incorporating electrically operable elements and having a frame, an engine compartment inside the frame, a mudguard outside the frame and lying beside the engine compartment, an engine within said compartment which develops heat during operation, one or more of said electrically operable elements being appurtenant said engine, a storage battery for supplying current to said electrically operable elements, including a battery box carried by the frame portion substantially at the common boundary of the engine compartment and mudguard, means for ventilating said box including an air draft-inducing duct portion opening beneath the mudguard outside said compartment.

3. Apparatus as set forth in claim 2 in which said draft-inducing portion beneath the fender includes an air inlet, air outlet means in the side of said box facing said engine compartment, and a removable cover substantially closing said side of the box.

4. Apparatus as set forth in claim 2 in which said draft-inducing portion beneath the mudguard includes an air inlet, and air outlet means in the side of said box facing said engine compartment.

5. In combination with an automotive vehicle incorporating electrically operable elements and having a frame, an engine compartment inside the frame, a mudguard outside the frame and lying in an area bounding at least a part of the engine compartment, an engine within said compartment which develops heat during operation, one or more of said electrically operable elements being appurtenant said engine, a storage battery for supplying current to said electrically operable elements, including a battery box carried by the frame portion substantially at the common boundary of said engine compartment and mudguard, and means for ventilating said box including an air inlet portion connected thereto and opening beneath said mudguard.

6. Means as set forth in claim 5 including inlet and outlet portions for said box both opening in said area beneath the mudguard and outside said compartment, means also located in said area for protecting the inlet against the unwanted entrance of foreign matter, said box having a removable cover portion opening into said engine compartment, and outlet means opening into said engine compartment in the direction of airflow therethrough, whereby such air flow assists withdrawal of air from the box.

7. Means as set forth in claim 5 including inlet and outlet portions for said box both opening in said area beneath the mudguard and outside said compartment, means also located in said area for protecting the inlet against the unwanted entrance of foreign matter, said box projecting into both said area and the engine compartment and having a cover portion normally closing its side facing the engine compartment and removable to expose such entire side of the battery and a portion of the top thereof, and outlet portions in said covered side opening into the engine compartment.

8. Means as set forth in claim 5 including inlet and outlet portions for said box both opening in said area beneath the mudguard and outside said compartment, means also located in said area for protecting the inlet against the unwanted entrance of foreign matter, said box projecting into both said area and the engine compartment and having a cover portion normally closing its side facing the engine compartment and removable to expose such entire side of the battery.

9. Means as set forth in claim 5 in which said supporting means includes holding portions directly secured to the frame for positioning the box.

10. In combination with an automotive vehicle incorporating electrically operable elements and including a frame, an engine compartment, said engine compartment having an engine therein which develops heat during operation, walls bounding said compartment, one or more of said electrically operable elements being appurtenant said engine, a storage battery for supplying current to said electrically operable elements, and means for supporting and ventilating said battery comprising a battery box supported at least partly by said frame adjacent one of said engine compartment walls, and air inlet and outlet portions opening into and from said box, at least the air inlet portion having a mouth arranged outside said compartment, said battery being accessible only from inside said compartment.

11. In combination with an automotive vehicle including electrically operable elements and having a frame, an engine compartment, said engine compartment having an engine therein which develops heat during operation, walls bounding said compartment, one or more of said electrically operable elements being appurtenant said engine, a storage battery for supplying current to said electrically operable elements, and means for supporting and ventilating said battery comprising a battery box supported by said frame adjacent one of said walls, and air inlet and outlet portions for inducing circulation of air through said box, the air inlet porton having a mouth opening outside said compartment, and the outlet portion being located in a position in the air stream past a portion of the vehicle when in operation and arranged to assist circulation through the box by inducing an outflow therefrom.

12. Apparatus as set forth in claim 10 including a dash panel separating the engine compartment from a load space of the vehicle, and in which the box is supported upon said dash panel, means for inducing a draft of air over the engine, the outlet portion being located in said air draft and opening in the direction thereof to assist by ejecting action the flow of ventilating air from the box.

13. Means as set forth in claim 10 in which said inlet portion extends through said wall adjacent which the battery is mounted.

14. Means as set forth in claim 10 in which at least a part of said box extends through said wall and said inlet portion projects from the engine compartment into the open air.

WALTER S. SAUNDERS.